United States Patent
Lissick

(10) Patent No.: US 9,641,497 B2
(45) Date of Patent: May 2, 2017

(54) MULTI-BROWSER AUTHENTICATION

(75) Inventor: Michael Lissick, Inver Grove Heights, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/082,969

(22) Filed: Apr. 8, 2011

(65) Prior Publication Data

US 2012/0260327 A1 Oct. 11, 2012

(51) Int. Cl.
*G06F 15/16* (2006.01)
*H04L 29/06* (2006.01)

(52) U.S. Cl.
CPC ............ *H04L 63/08* (2013.01); *H04L 63/083* (2013.01); *H04L 63/0838* (2013.01); *G06F 2221/2105* (2013.01)

(58) Field of Classification Search
CPC .......................... H04L 63/083; H04L 63/0838
USPC ................. 726/9, 12; 709/218–224; 717/126
See application file for complete search history.

(56) References Cited

U.S. PATENT DOCUMENTS

| | | | |
|---|---|---|---|
| 6,151,599 A | 11/2000 | Shrader et al. | |
| 7,191,467 B1 | 3/2007 | Dujari et al. | |
| 7,240,192 B1 | 7/2007 | Paya et al. | |
| 7,277,912 B2 | 10/2007 | Corboy et al. | |
| 7,379,977 B2 | 5/2008 | Walrath | |
| 7,478,142 B1* | 1/2009 | Veditz | 709/218 |
| 2002/0120867 A1* | 8/2002 | Mitchell et al. | 713/201 |
| 2003/0236919 A1* | 12/2003 | Johnson et al. | 709/251 |
| 2006/0075088 A1* | 4/2006 | Guo et al. | 709/224 |
| 2006/0200425 A1* | 9/2006 | Steele | G06F 21/41 705/64 |
| 2007/0157304 A1* | 7/2007 | Logan | H04L 67/02 726/12 |
| 2008/0155012 A1* | 6/2008 | Chiang | G06F 17/30905 709/203 |
| 2009/0094298 A1* | 4/2009 | Bondurant et al. | 707/204 |
| 2009/0150806 A1* | 6/2009 | Evje et al. | 715/762 |
| 2009/0228504 A1* | 9/2009 | Brown | G06F 17/30884 |
| 2010/0031153 A1* | 2/2010 | Ortwein | G06F 9/542 715/733 |
| 2010/0043065 A1* | 2/2010 | Bray et al. | 726/8 |
| 2010/0115451 A1* | 5/2010 | Moore et al. | 715/777 |
| 2010/0211865 A1 | 8/2010 | Fanning et al. | |
| 2010/0211893 A1 | 8/2010 | Fanning et al. | |
| 2011/0078663 A1* | 3/2011 | Huang et al. | 717/126 |

(Continued)

OTHER PUBLICATIONS

"Browsera", Retrieved at << http://www.browsera.com/featues >>, Retrieved Date: Dec. 21, 2010, pp. 4.
Ken., "Cross browser checks of pages behind a user name / password", Retrieved at << http://crossbrowsertesting.com/blog/cross-browser-checks-pages-behind-user-name-password >>, Jan. 27, 2010, pp. 2.
"Web Performance Load Tester Basic Feature List", Retrieved at << http://www.webperformanceinc.com/load_testing/featurelist.html >>, Retrieved Date: Dec. 21, 2010, pp. 5.

*Primary Examiner* — Backhean Tiv
*Assistant Examiner* — Weiwei Stiltner
(74) *Attorney, Agent, or Firm* — David W. Grillo

(57) ABSTRACT

The content rendering capability of web browsers can be tested and compared across different web browsers. Testing with respect to restricted content is enabled utilizing a web browser to facilitate authentication. State information acquired by the web browser from a server can be employed to request restricted content for rendering by a number of target web browsers sought to be tested. Subsequently, representations of the restricted content produced by target web browsers can be rendered to a multi-browser display environment, for example.

20 Claims, 6 Drawing Sheets

(56) References Cited

U.S. PATENT DOCUMENTS

| | | | |
|---|---|---|---|
| 2011/0087907 A1* | 4/2011 | Jantunen | H02J 17/00 713/320 |
| 2011/0115800 A1* | 5/2011 | Desai | 345/501 |
| 2011/0185016 A1* | 7/2011 | Kandasamy | G06Q 30/02 709/203 |
| 2011/0289489 A1* | 11/2011 | Kumar et al. | 717/135 |
| 2011/0307700 A1* | 12/2011 | Wahlstrom | 713/176 |
| 2012/0158841 A1* | 6/2012 | Liu | 709/204 |
| 2012/0197971 A1* | 8/2012 | Jiang | 709/203 |
| 2012/0210236 A1* | 8/2012 | Prasad | G06F 11/3604 715/738 |
| 2012/0210413 A1* | 8/2012 | Akula | H04L 63/0815 726/8 |
| 2012/0260321 A1* | 10/2012 | Wendt | H04L 9/0863 726/5 |

\* cited by examiner

MULTI-BROWSER AUTHENTICATION

BACKGROUND

One tool that has become increasingly important to web page authors is a multi-browser testing tool. The tool permits authors to view and test their web pages in multiple web browsers. As an example, if a uniform resource locator (URL) such as "www.abc.com" is provided to such a tool, a series of renderings of the content, as displayed in different web browsers (e.g., Internet Explorer®, FireFox®, Safari®, Chrome™ . . . ), is returned. These renderings, which are created by the actual web browser engines, can be compared side-by-side, overlaid, and interrogated to identify differences, which are typically due to the way each web browser implements HTML (HyperText Markup Language) and CSS (Cascading Style Sheets) markup. Once the differences are isolated, the web page author can make adjustments to minimize or eliminate the differences.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to multi-browser authentication, and more specifically authentication with respect to multi-browser testing. Access to content protected by an authentication mechanism is facilitated utilizing a web browser. Relying on established web browser functionality, identification information can be acquired and submitted to a server. State information (e.g. cookies, authentication information) returned by the server in response to successful authentication is captured and utilized to retrieve content for multiple browsers of interest. The retrieved content can subsequently be rendered by corresponding web browser engines and presented in a multi-browser display environment, for example, to facilitate comparison.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Multi-browser testing is often performed to ensure content is presented consistently across different web browsers. However, a problem exists with respect to multi-browser testing tools when access to content is dependent upon authentication. For example, users are typically required to login in order to view the contents of their respective e-mail inboxes. This is problematic for conventional multi-browser testing tools, because they typically point web browser engines to a location of content. Instead of receiving the content, however, a login/authentication page, or the like, is provided, essentially blocking access to the content.

Details below are generally directed toward permitting multi-browser testing tools to deal with authentication across multiple web browsers. A web browser can be exploited to collect identification information and acquire state information from a server. Such state information including authentication information can subsequently be utilized in conjunction with requesting content for web browsers of interest. The authentication information evinces prior successful authentication and avoids conventional problems. Subsequently, representations of content rendered by web browser engines can be rendered in a multi-browser display environment, for example.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
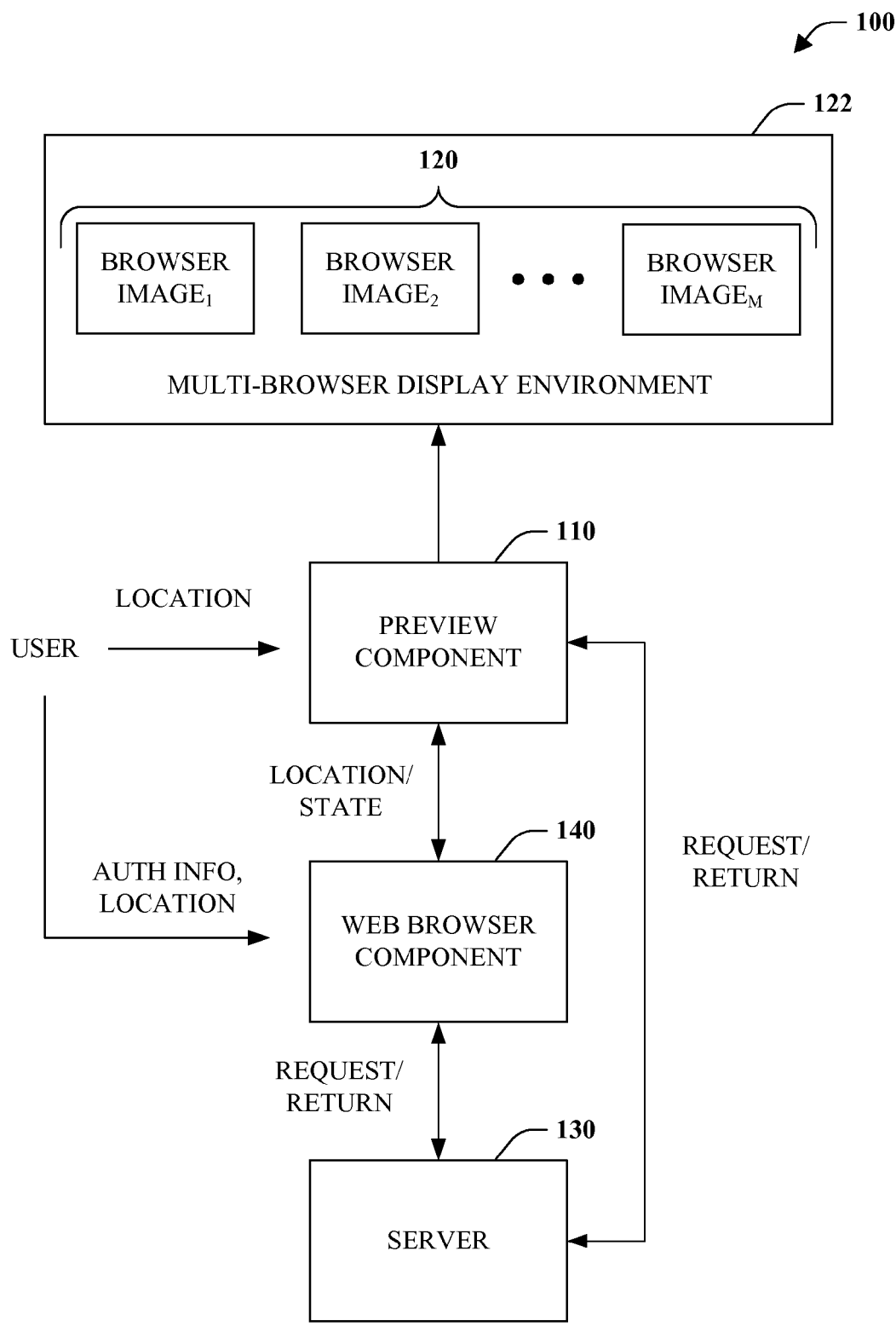
FIG. 1 is a block diagram of system that facilitates multi-browser testing.

Referring initially to FIG. 1, a system 100 that facilitates multi-browser testing in conjunction with authentication is illustrated. Preview component 110 renders browser images 120 (BROWSER IMAGE$_1$-BROWSER IMAGE$_M$, where "M" is an integer greater than one), or in other words representations of content produced by a particular web browser, in multi-browser display environment 122. Stated differently, content as displayed across multiple web browsers is previewed. Developers/authors can review the browser images 120 for layout or appearance inconsistencies across different web browsers (e.g., Internet Explorer®, Firefox®, Safari®, Chrome™ . . . ) including different versions of a web browser (e.g., Internet Explorer® 6 vs. Internet Explorer® 9).

Conventionally, the preview component 110 can simply point web browsers of interest, or more particularly web browser engines (a.k.a. layout engine or rendering engine), to the location of content on server 130, for example by way of a uniform resource locator (URL). The web browser engines can then return a representation, or browser image 120, thereof that can be displayed in the multi-browser display environment 122. However, where authentication is utilized, a login/authentication page, or like mechanism, can be presented, which blocks access to content until identification information is provided. This is problematic when dealing with a plurality of web browsers, as is the case in multi-browser testing.

Web browser component 140 can be exploited to address authentication. The web browser component 140 can correspond to any known or novel web browser (including interface and engine sub-components (not shown)). A user, such as a web page author, can indicate to the preview component 110 that desired content is restricted, or in other words necessitates authentication. The web browser component 140 can then be employed to acquire user identification information such as a user name and access code (e.g., password, passcode . . . ) and submit the information to the server 130, such as a web server, using established functionality. If the identification information is recognized by the server 130, the server 130 will send back state information (e.g., one or more cookies) including authentication information (e.g., token) indicating successful authentication and optionally other information such as preferences, among other things. The preview component 110 can acquire this state information and submit it with a request to the server 130 for content for different web browsers of interest. The server 130 convinced by the provided state information that authentication has already occurred will send back the requested content to the preview component 110. The preview component 110 can then direct web browser engines corresponding to web browsers of interest to render the content (e.g., HTML page and set of assets (style sheets, images, JavaScript . . . )), which can be subsequently utilized to populate the multi-browser display environment 122.

Initially, a user (e.g., web developer, page author . . . ) can provide a location of restricted content to the preview component 110 and indicate authentication is required. As a result, the web browser component 140 can be spawned and utilized to collect identification information. In this case, the web browser component 140 can be directed to the location of identified content. Alternatively, the user can simply indicate that authentication will be employed and subsequently provide the location to the web browser component 140. Regardless, upon successful authentication the particular content will be made available for rendering by a web browser engine (not shown) of a modularly designed, web browser component 140. However, the user can is not limited to simply previewing that content, namely the content directly behind a login/authentication page, for example. Since the user has been authenticated and a web browser is being employed, the user can navigate restricted content and ultimately select different content to previewing.

Figure 2:
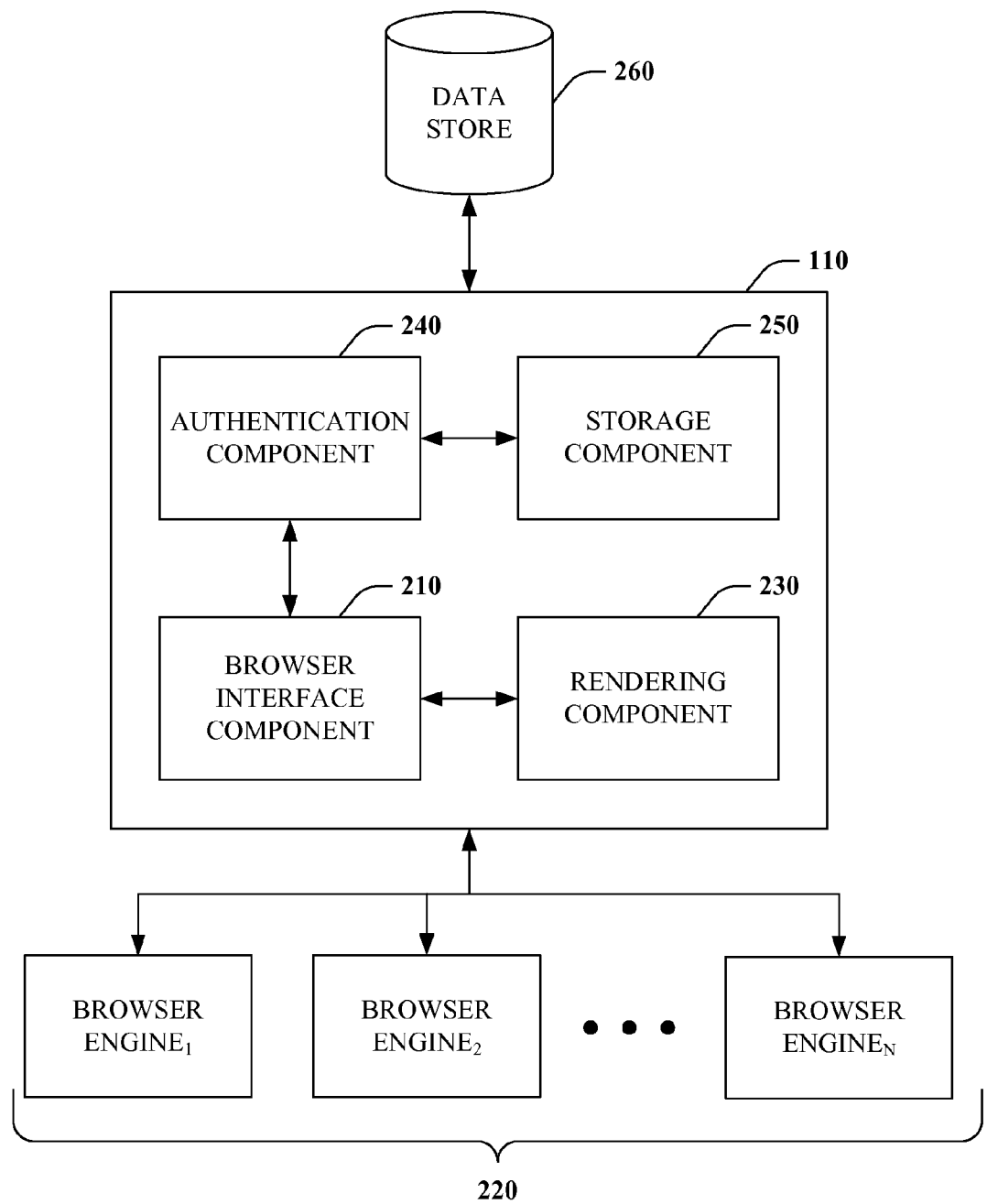
FIG. 2 is a block diagram of a representative preview component.

Turning attention to FIG. 2, a representative preview component 110 is illustrated to provide further detail. The preview component 110 includes browser interface component 210 configured to enable interaction with one or more web browser engines 220 (BROWSER ENGINE$_1$-BROWSER ENGINE$_N$, where "N" is an integer greater than one). The one or more web browser engines 220 are sub-components of web browsers, as well as other applications (e.g., e-mail clients), that renders content. More specifically, a web browser engine can take content (e.g., HTML, XML, image files . . . ) along with formatting information (e.g., cascading style sheets (CSS), extensible stylesheet language transformations (XSLT) . . . ) display the content accordingly. As used herein, unless otherwise noted, content is used in its general sense including formatting information, for example. The web browser engine can be local or remote. For example, a web browser engine can be offered as a network accessible service. The browser interface component 210 allows provisioning of content and other assets, such as formatting information, to the one or more web browser engines 220 as well as acquisition of a resulting representations, or images, rendered thereby.

The preview component 110 also includes rendering component 230 configured to render one or more web browser images to a multi-browser display environment, for example. More particularly, the rendering component 230 can receive, retrieve, or otherwise obtain or acquire results of rendering content by one or more of the browser engines 220, for example through interaction with the browser interface component 210. One or more images can then be displayed to facilitate identification of inconsistencies in presentation across web browsers.

Authentication component 240 also forms part of the preview component 110. The authentication component 240 is configured to initiate authentication and acquire content for rendering by a web browser engine. As previously described, in accordance with one aspect of this disclosure, a web browser can be exploited to perform authentication. Accordingly, the authentication component 240 can be configured to spawn a web browser for this purpose. Based on information acquired by the web browser, content can be acquired for rendering by web browser engines 220 corresponding to web browsers of interest.

Figure 3:
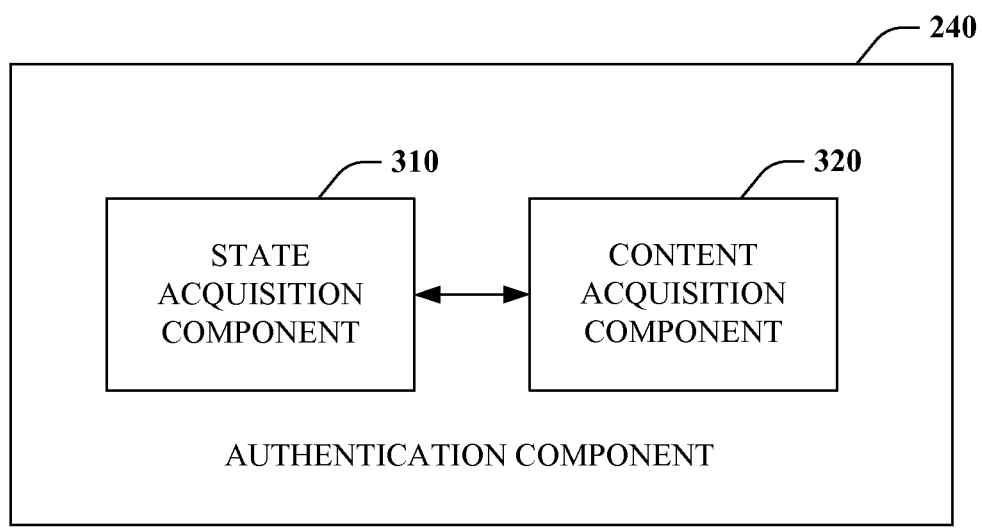
FIG. 3 is a block diagram of a representative authentication component.

Briefly referring to FIG. 3, a representative authentication component 240 is illustrated in further detail. As shown, the authentication component 240 includes state acquisition component 310 and content acquisition component 320. The state acquisition component 310 is configured to acquire state information returned by a server to the web browser. In accordance with one embodiment, the state information can be embodied as one or more cookies. Moreover, the state information, or one or more cookies, can include authentication information indicative of successful authentication.

The content acquisition component 320 is configured to utilize state information acquired by the state acquisition component 310 to acquire content for browsers of interest from a server. The content acquisition component 320 can utilize state information and more particularly authentication information, or the like, to convince a server that that authentication has already occurred thereby avoiding any potential login/authentication page, for instance. Furthermore, a browser identifier (e.g., user agent string in HTTP header) can be provided identifying a specific web browser with which content will be rendered. In other words, content specific to a particular web browser can be acquired. Such a process of requesting browser specific content utilizing authentication information, and optionally other state information, can be performed multiple times for each web browser of interest.

Returning to FIG. 2, the preview component 110 can also include storage component 250 communicatively coupled with the authentication component 240. The storage component 250 is configured to save and retrieve state information to a data store 260. More particularly, state information retrieved as a function of user interaction with a server through a browser can be saved by the storage component 250. Subsequently, the authentication component 240 can request saved state information prior to spawning a web browser to acquire the information. If the state information is available and still valid (e.g., cookies have not expired), the storage component 250 can retrieve the state information from the data store 260 and return it to the authentication component 240. The storage component 250 can also provide maintenance with respect to the data store 260 by removing expired state information and/or reorganizing state information for expeditious access, among other things.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, preview component 110 utilize such mechanisms to infer web browsers of interest, perhaps from historical usage information and can initiate acquisition of corresponding content based on anticipated need.

Figure 4:
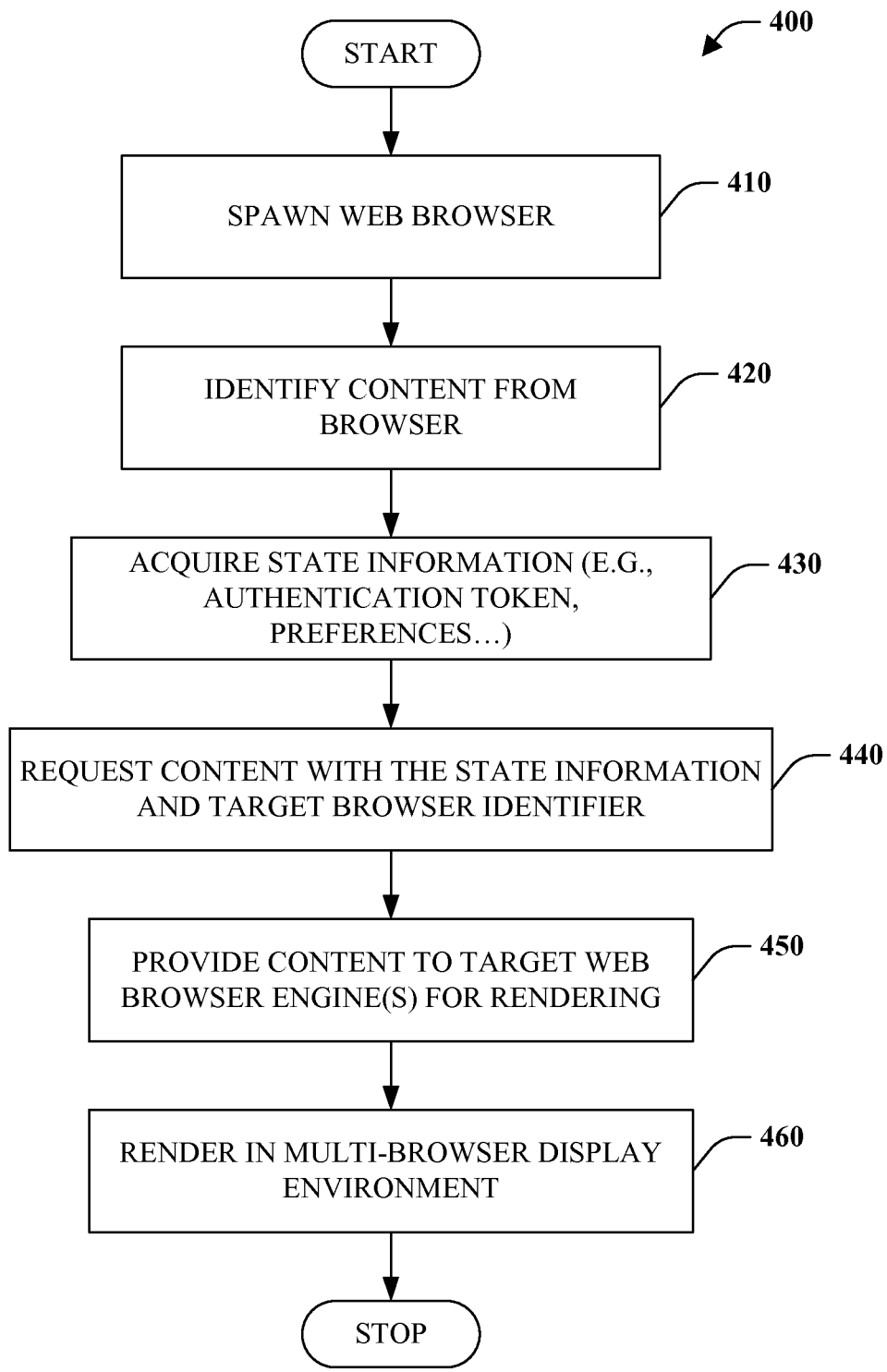
FIG. 4 is a flow chart diagram of a method of facilitating multi-browser testing.
Figure 5:
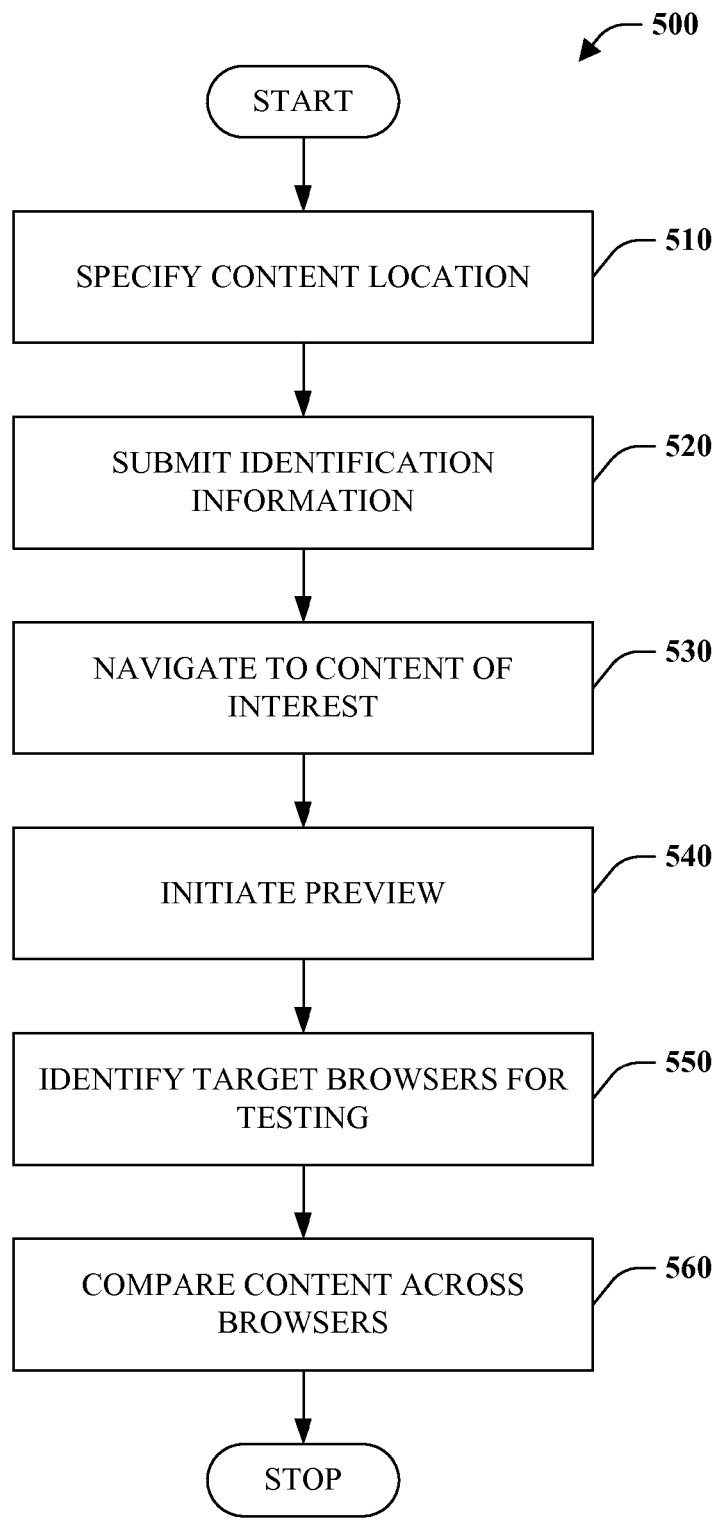
FIG. 5 is a flow chart diagram of a method of user action with respect to multi-browser testing.

In view of the exemplary systems described supra, methodologies that may be implemented in accordance with the disclosed subject matter will be better appreciated with reference to the flow charts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method 400 of facilitating multi-browser testing is depicted. At reference numeral 410, a web browser is spawn to perform authentication functionality, among other thing. In other words, execution of web browser can be initiated. Where a content location (e.g., URL) is known, it can be provided to the web browser as part of the initiation process. At numeral 420, content of interest for previewing can be identified from the browser. In accordance with one aspect, a user can utilize the browser to navigate restricted content after authentication to identify content deep within a website rather than simply the first page after an authentication page, for example. At reference 430, state information (e.g., authentication information, preferences, shopping cart content . . . ), obtained from a server through the web browser, based on user interaction, can be acquired. At 440, content can be requested from the server utilizing the state information to avoid re-authentication. Furthermore, the content can be requested with a target web-browser identifier to enable acquisition of browser specific content. At reference numeral 450, acquired content is provided to a corresponding target web-browser engine(s) for rendering. At numeral 460, the representation(s) or browser image(s) produced by the web browser engine(s) is rendered in a multi-browser display environment to facilitate cross-browser comparison of content appearance/layout.

FIG. 5 illustrates a method 500 of user action with respect to multi-browser testing in the presence of authentication in accordance with aspects of the disclosed subject matter. At reference numeral 510, location of content of interest for previewing in multiple web browsers is specified. For example, a uniform resource locator (URL) can be specified within a web browser. At numeral 520, identification information such as user name and access code (e.g., password, passcode . . . ) is submitted through a web browser. At reference 530, a user can continue to navigate content of interest utilizing the web browser. When the content of interest is identified, a preview can be initiated at 540. At reference numeral 550, target browsers for testing are identified. At numeral 560, content rendered by multiple browsers is compared to identify inconsistencies in presentation, for example. Subsequently, content can be modified to minimize or eliminate inconsistences.

Techniques described with respect to the above systems and methods have many benefits over alternative approaches to multi-browser authentication. One alternative is to employ an interface or invisible layer (e.g., sneeze guard) over an image or snapshot of a returned login/authentication page that accepts identification information and uses the information to acquire an image of content behind the login/authentication page. However, this involves management of identification information, specifically collection, persistence, and resubmission of user name and access code, which exposes many complications and potential security issues. Furthermore, it is difficult to construct an interface or the like that can accommodate differences in where and how requests for identification information are made. For example, some websites can slide in a login text boxes from the top, left, right, or bottom upon clicking a particular button.

Another approach is to employ a network proxy to intercept and process network traffic. More specifically, calls leaving a machine can be intercepted and analyzed to determine a set of cookies that are utilized to access restricted content. Similar to the first alternative approach, this approach suffers from significant added complexity as well as potential security issues related to network traffic interception.

The subject approach, as claimed, avoids issues involved with alternative approaches described above. First, the complexity involved with employing a web browser for authentication is nominal, and utilizing a web-browser user interface provides a high-level of fidelity in user experiences in contrast to an additional layered interface, for example. Second, established web browser logic involved with authentication is generally secure and trusted. State information (e.g., cookies) is also acquired after conventional processing, and the information is valid for a limited period of time (e.g., expiration date) further limiting security issues.

It is to be appreciated that the functionality described above is not limited to any particular hardware and/or software. For example, content can be previewed with respect to browsers regardless of operating system dependence. Further, content can be previewed on many different types of hardware and/or software.

As used herein, the terms "component," "system," "engine," as well as forms thereof (e.g., components, sub-components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
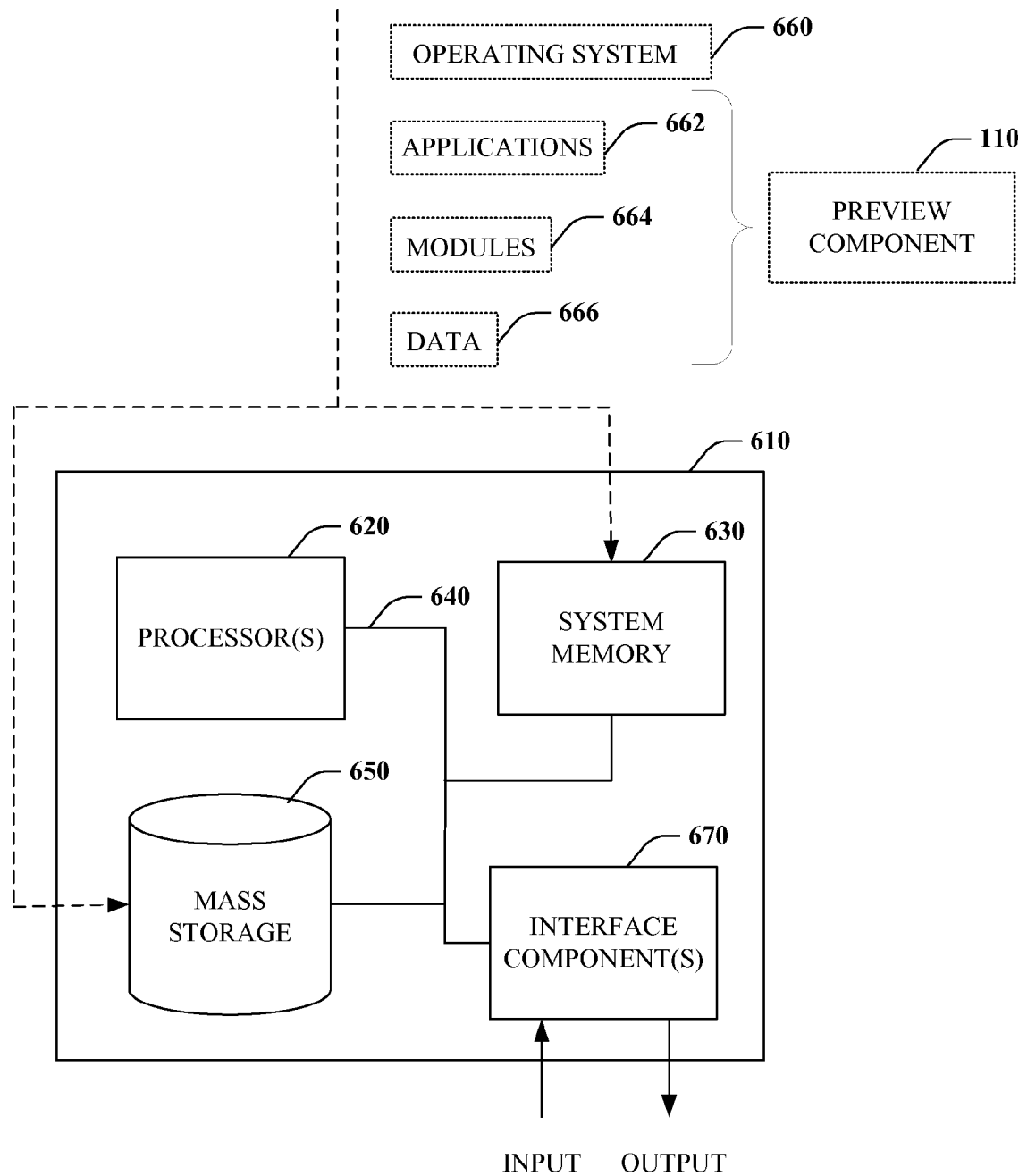
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 610.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, the preview component 110, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the preview component 110 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610 through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating testing, comprising:
   employing at least one processor configured to execute computer-executable instructions stored in memory to perform the following acts:
   receiving an address of content to test multi-browser consistency;
   invoking a first web browser with the address of the content;
   receiving authentication information in the first web browser in response to a login request received by the first web browser from a server in place of the content;
   receiving state information from the server in response to transmission of valid authentication information to the server by a first web browser;
   requesting content from the server directly, without using a browser, with the state information, and a browser identifier of a second web browser, different from the first web browser, wherein the browser identifier identifies a web browser with which content will be rendered;
   receiving the content, specific to the second browser, from the server; and
   rendering a representation of the content, rendered by a second web-browser engine, in a multi-browser display environment configured to display a plurality of representations of content rendered by different web-browser engines in a single user interface.

2. The method of claim 1 further comprises saving the authentication information.

3. The method of claim 1 further comprises retrieving the authentication information from a data store.

4. The method of claim 1 further comprises:
   submitting the content received in response to the request to a remote web browser engine; and
   receiving the representation of the content rendered by the remote web browser engine.

5. The method of claim 1 further comprise receiving a cookie saved by the first web browser that encapsulates the state information and submitting the cookie with a request for content from the server for the second web browser.

6. The method of claim 4 further comprises receiving a browser image as the representation of the content as rendered by the remote web browser engine.

7. The method of claim 1 further comprises sending the browser identifier as part of a user-agent string in a hypertext transport protocol header.

8. The method of claim 1 further comprises sending the browser identifier comprising a browser name and version.

9. A system of facilitating testing, comprising:
a processor coupled to a memory, the processor configured to execute the following computer-executable components stored in the memory:
a acquisition component that acquires state information provided by a web server in response to successful authentication with the web server associated with procurement of restricted content by a first web browser;
a content acquisition component that requests the restricted content specific to a second web browser, different from the first web browser, with the state information and a browser identifier of the second web browser that identifies a web browser with which content will be rendered; and
a rendering component that renders images of the restricted content as displayed by the first web browser and the second web browser in a single display environment.

10. The system of claim 9, the browser identifier is a user-agent string in a hypertext transport protocol header.

11. The system of claim 9 further comprises a web browser component that accepts user identification information and acquires the state information.

12. The system of claim 11, the web browser component is further configured to enable navigation and selection of the restricted content.

13. The system of claim 11 further comprises a storage component that stores the state information.

14. The system of claim 9, the second web browser is a remote browser.

15. The system of claim 9, acquired state information is encapsulated in a cookie saved by the first web browser.

16. The system of claim 9, the browser identifier comprises a browser name and version.

17. A computer-readable storage device having instructions stored thereon that enable at least one processor to perform a method upon execution, the method comprising:
employing a first web browser to authenticate a user on a web server and identify content available on the web server after authentication;
acquiring a set of one or more cookies received by the first web browser from the web server without intercepting the set of one or more cookies from network traffic;
determining a browser identifier associated with a browser selected by a user for testing;
requesting the content from the web server with the set of one or more cookies and the browser identifier of a second web browser, different from the first web browser, wherein the browser identifier identifies a browser with which content will be rendered;
receiving the content, specific to the second web browser, from the web server;
employing a web browser engine for the second web browser to render the content; and
rendering an image produced by the web browser engine to a multi-browser display environment configured to enable display of a plurality of representations of content rendered by different web-browser engines in a single user interface.

18. The computer-readable storage device of claim 17, the method further comprises saving the set of one or more cookies.

19. The computer-readable storage device of claim 17, the method further comprises employing the web browser engine at a remote location.

20. The computer-readable storage device of claim 17, determining an identifier comprises determining a user-agent string in a hypertext transport protocol.

* * * * *